(12) United States Patent
Fan et al.

(10) Patent No.: US 7,583,249 B2
(45) Date of Patent: *Sep. 1, 2009

(54) BACKLIGHT MODULE AND LIQUID CRYSTAL DISPLAY DEVICE

(75) Inventors: Kuo-Shu Fan, Tainan County (TW); Ta-Chin Huang, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 365 days.

This patent is subject to a terminal disclaimer.

(21) Appl. No.: 11/257,321

(22) Filed: Oct. 24, 2005

(65) Prior Publication Data

US 2006/0083026 A1    Apr. 20, 2006

Related U.S. Application Data

(62) Division of application No. 10/205,255, filed on Jul. 25, 2002, now Pat. No. 6,977,641.

(30) Foreign Application Priority Data

Jan. 29, 2002    (CN)    ............... 91 1 01491

(51) Int. Cl.
*G09G 3/36*    (2006.01)
(52) U.S. Cl. ............... 345/102; 345/87; 345/88; 345/89
(58) Field of Classification Search ............ 345/102, 345/87, 89, 55, 88, 659, 75.2, 7, 8, 905; 315/169.3, 315/169.4, 291; 349/71, 61, 110, 113, 58, 349/150; 313/495; 257/433, 447; 362/97, 362/306, 311, 368, 633, 613, 612, 582, 628, 362/235

See application file for complete search history.

(56) References Cited

U.S. PATENT DOCUMENTS

| | | | | |
|---|---|---|---|---|
| 4,379,647 A | * | 4/1983 | Kempf | ............ 401/262 |
| 4,748,546 A | | 5/1988 | Ukrainsky | |
| 4,945,350 A | | 7/1990 | Kawamura | |
| 5,214,522 A | | 5/1993 | Tagawa | |
| 5,694,793 A | * | 12/1997 | Nishimura et al. | ...... 68/12.27 |
| 5,808,597 A | | 9/1998 | Onitsuka et al. | |
| 6,069,449 A | | 5/2000 | Murakami | |
| 6,089,739 A | | 7/2000 | Yamamoto et al. | |
| 6,181,301 B1 | * | 1/2001 | Inoguchi et al. | ............ 345/5 |
| 6,393,220 B1 | * | 5/2002 | Nose et al. | ............ 396/205 |
| 6,559,825 B2 | * | 5/2003 | Jacobsen et al. | ......... 345/102 |
| 6,639,636 B2 | * | 10/2003 | Yoo et al. | ............ 349/61 |

(Continued)

FOREIGN PATENT DOCUMENTS

JP    7-270783    10/1995

(Continued)

*Primary Examiner*—Prabodh M Dharia

(57) ABSTRACT

The present invention mainly relates to a backlight module for use in a liquid display device. The backlight module comprises a plurality of lamps located above a reflecting plate. Each lamp comprises two ends while each end comprises an electrode. Voltage required for the lamps is provided by at least one circuit board located at least one of two sides of the reflecting plate; wherein the electrodes electrically connect to the at least one circuit board directly. Sizes of the backlight can be reduced in the present invention. Furthermore, costs of material and manufacturing are also reduced.

10 Claims, 4 Drawing Sheets

U.S. PATENT DOCUMENTS

| | | |
|---|---|---|
| 6,661,181 B2 | 12/2003 | Shin |
| 6,674,250 B2 * | 1/2004 | Cho et al. .................. 315/291 |
| 6,749,315 B2 * | 6/2004 | Moon et al. ................... 362/97 |
| 6,798,150 B2 * | 9/2004 | Moon ...................... 315/169.3 |
| 6,902,300 B2 * | 6/2005 | Lee ............................ 362/306 |
| 2002/0021564 A1* | 2/2002 | Cho et al. .................... 362/97 |
| 2002/0030650 A1* | 3/2002 | Kawada et al. ................ 345/87 |
| 2002/0041268 A1 | 4/2002 | Yajima et al. |
| 2002/0057238 A1 | 5/2002 | Nitta et al. |
| 2002/0057405 A1* | 5/2002 | Morishita et al. ........... 349/113 |
| 2003/0090454 A1* | 5/2003 | Adler ......................... 345/102 |
| 2003/0111701 A1* | 6/2003 | Yoo et al. ................... 257/433 |
| 2003/0122771 A1 | 7/2003 | Sumiyoshi et al. |
| 2003/0201969 A1 | 10/2003 | Hiyama et al. |
| 2004/0051692 A1 | 3/2004 | Hirakata et al. |
| 2004/0076396 A1 | 4/2004 | Suga |
| 2004/0114343 A1 | 6/2004 | Ho |
| 2004/0160546 A1 | 8/2004 | Huang et al. |
| 2004/0208210 A1 | 10/2004 | Inoguchi |
| 2004/0232853 A1* | 11/2004 | Hur et al. .................... 315/291 |
| 2005/0111219 A1 | 5/2005 | Mai |
| 2005/0116913 A1 | 6/2005 | Ha et al. |
| 2005/0122739 A1 | 6/2005 | Huang et al. |

FOREIGN PATENT DOCUMENTS

| | | | |
|---|---|---|---|
| JP | 7-272507 | | 10/1995 |
| JP | 2001-272659 | | 10/2001 |
| JP | 2002-131744 | * | 5/2002 |

* cited by examiner

BACKLIGHT MODULE AND LIQUID CRYSTAL DISPLAY DEVICE

REFERENCE TO RELATED APPLICATION

This application is a divisional of U.S. Non-Provisional application Ser. No. 10/205,255 filed Jul. 25, 2002, now issued as U.S. Pat. No. 6,977,641, the entire contents of which are incorporated herein by reference.

BACKGROUND OF THE INVENTION

1. Field of the Invention

The present invention mainly relates to a backlight module used in a liquid crystal display device, more particularly, to the connections between lamps and circuit boards in a backlight module.

2. Description of the Related Art

A typical liquid crystal display device mainly comprises a liquid crystal panel. Because the liquid crystal panel does not emit light itself, a backlight module is needed to provide the liquid crystal panel enough luminescence. In order to comply with consumers' requests, the backlight module is directed to reducing the weight and saving the cost.

Nowadays, there are many kinds of backlight module of liquid crystal display device used in this field; wherein a direct under type backlight module 1 is shown in FIG. 1 which comprises a plurality of U-shaped (or linear) lamps 11 disposed above a reflecting plate 13 to provide the liquid crystal panel light source. Each end of the lamp 11 is connected to a wire 113 through an electrode 111, and the wires 113 located at the two ends of one lamp 11 are co-connected to a connector 114. The connector 114 is further connected to an output 121 on a circuit board 12 which provides the lamp 11 voltage required for illuminating. Besides, a dielectric protecting tube 112 which isolates the high voltage electrode 111 and allows the wire 113 to extend to outside, is usually applied to the electrode 111 to protect it.

The disadvantage of the backlight module 1 is an over large size thereof. Because the circuit board 12 which lies in the backlight module 1, connected with the lamp 11 through the wire 113 and the connector 114, a space should be kept for receiving the circuit board 12, wire 113 and connector 114 in an inactive area besides an active area for showing data. Therefore, the size cannot be reduced. In addition, the electrode 111 of the lamp 11 should be connected to the wire 113 first, and then the wires 113 at the two ends of the lamp 11 are connected to the connector 114 of the circuit board 12. Short appears in connections of such complicated connecting easily and forms defects. Furthermore, costs of material and manufacturing are high as each lamp 11 is connected to the output 121 through the connecter 114.

Therefore, the present invention is directed to developing a novel and improved backlight module by reducing the size of a liquid crystal display device and saving its cost.

SUMMARY OF THE INVENTION

One objective of the present invention is to provide a backlight module for use in a liquid crystal display device. The backlight module comprises a plurality of lamps located above a reflecting plate. Each lamp comprises two ends while each end comprises an electrode. Voltage required for the lamps is provided by at least one circuit board located at least one of two sides of the reflecting plate; wherein the electrodes electrically and physically connect to the at least one circuit board directly. Sizes of the backlight can be reduced in the present invention. Furthermore, costs of material and manufacturing are also reduced.

BRIEF DESCRIPTION OF THE DRAWINGS

FIG. 2a illustrates parts of a backlight module according to the first embodiment of the invention, and FIG. 2b is a front view illustrating FIG. 2a; and FIG. 3a illustrates parts of a backlight module according to the second embodiment of the invention, and FIG. 3b is a front view illustrating FIG. 3a.

DETAILED DESCRIPTION OF THE INVENTION

The preferred embodiments in the invention are described below.

The First Embodiment

Figure 1:
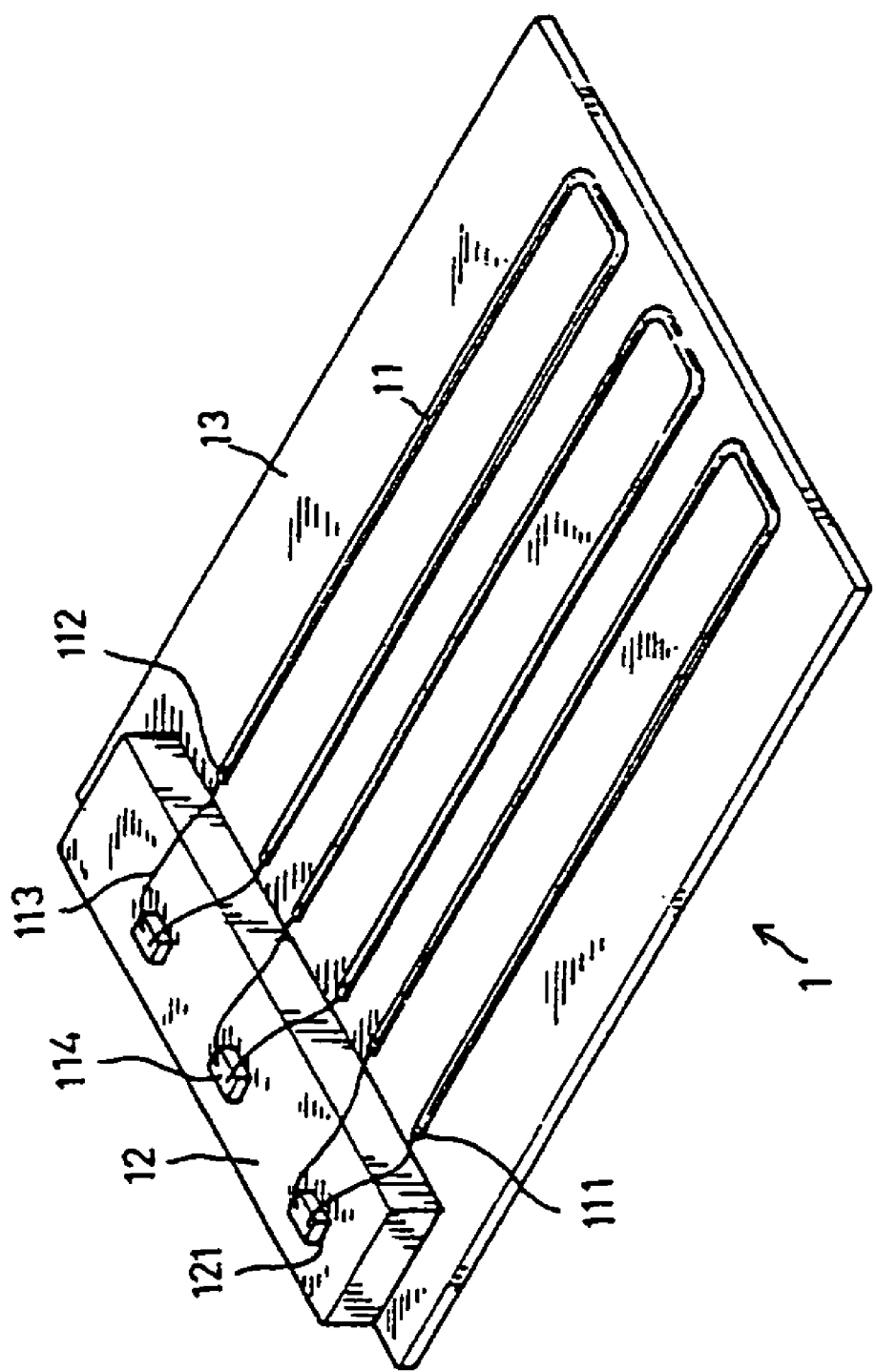
FIG. 1 illustrates parts of a conventional backlight module.
Figure 2:
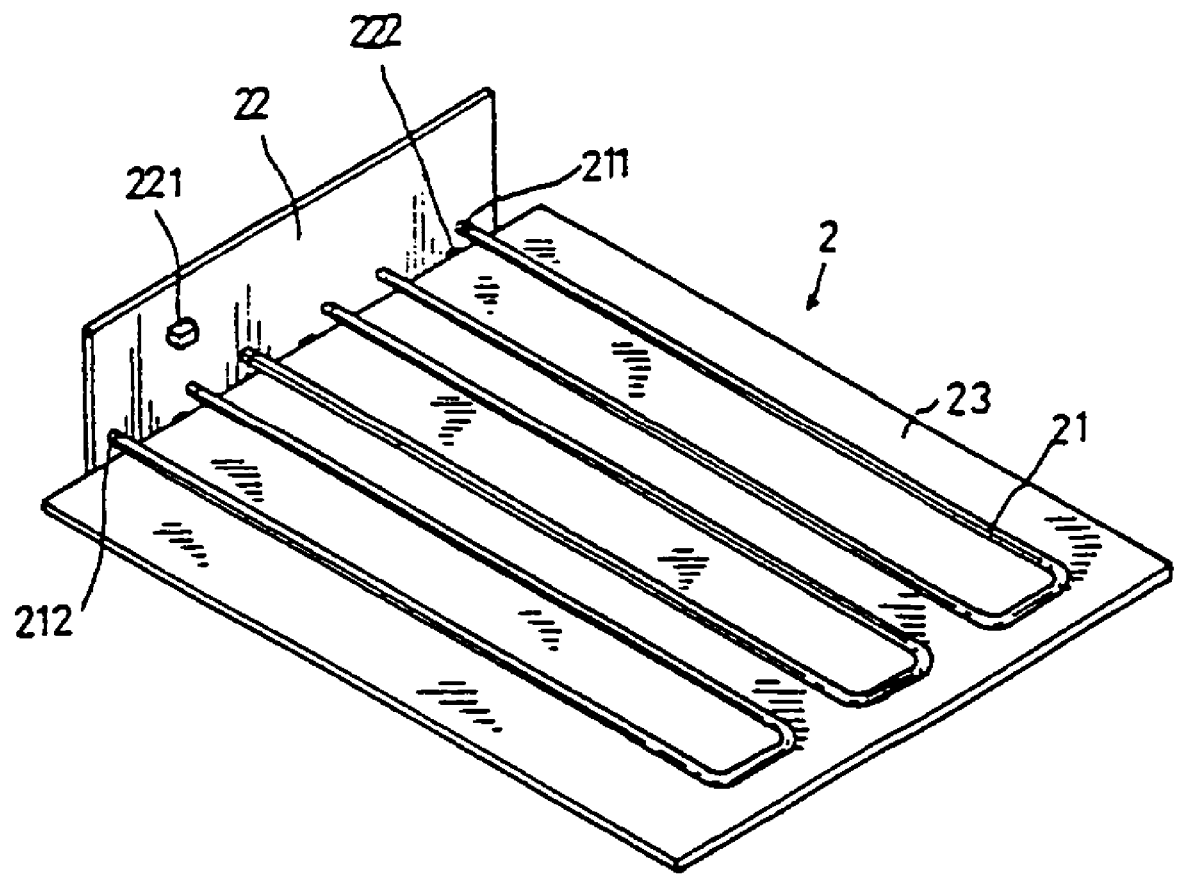
Figure 2:
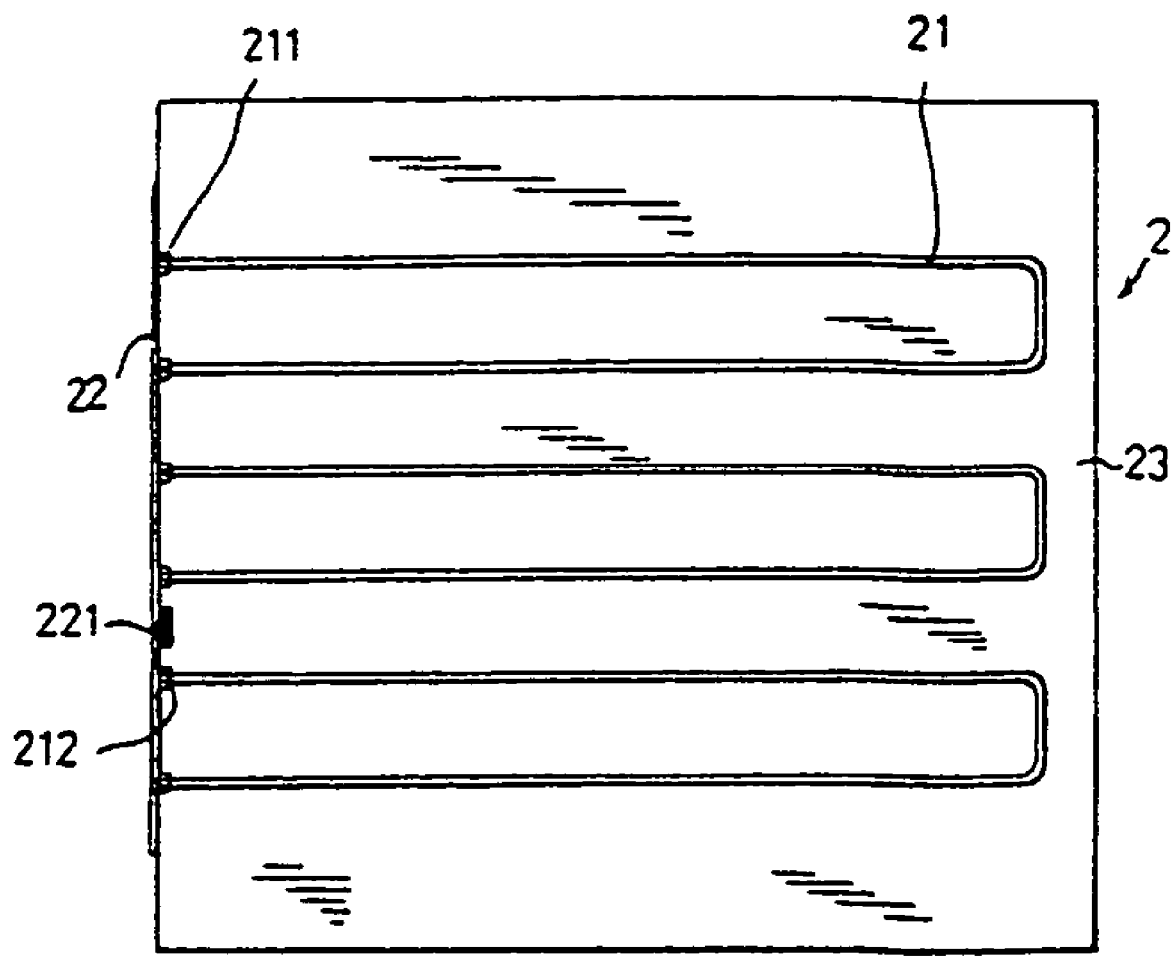

FIGS. 2a and 2b illustrate a backlight module 2 which comprises a plurality of U-shaped lamps 21 and light emitted therefrom is reflected by a reflecting plate 23 disposed under the lamps 21 to a liquid crystal panel. Each lamp 21 comprises two ends, each including an electrode 211 inputting power to the lamp 21, and the electrode 211 further electrically and physically connects to a circuit board 22 located at one side of the reflecting plate 23 to simultaneously provide voltage required for the lamps 21. The circuit board 22 can deliver voltage output by a single output 221 to the electrodes 211 separately through circuits on the circuit board 22. Besides, the circuit board 22 is disposed vertically to the reflecting plate 23 to connect the circuit board 22 directly. Preferably, the height of the circuit board 22 is less than the thickness of the backlight module 2. In the embodiment, the backlight module 2 further comprises a back cover (not shown), and the circuit board 22 further comprises a plurality of fixing elements 222 for fixing the circuit board 22 to the back cover. Besides, a protecting tube 212 for protecting and isolating the electrodes 211 can be applied to wrap the electrodes 211 as well; wherein the protecting tubes are made of dielectric material.

The circuit board 22 vertically to the reflecting plate 23 electrically and physically connects the electrodes 211 of the lamp 21 directly. All known methods can be utilized to attain such connections, for example, welding directly, connecting the electrodes 211 and the circuit board 22 through a wire and then cutting off excess wires. Since the wires are not necessary for connecting the circuit board, it is not necessary to provide every connector an output, either. Therefore, chances of short resulting from complicated connections in the prior art are quite slim, and steps of manufacturing are simplified, too. Besides, the present invention avoids having excess wires, connectors and outputs, and has the advantage of cost control. It is a great improvement in sizes of liquid crystal display device that a minimal space of disposing the vertical circuit board should be kept in an inactive area of the backlight module and the thickness thereof is not increased. Thus, the liquid crystal display device has an advantage of small volume.

The Second Embodiment

Figure 3:
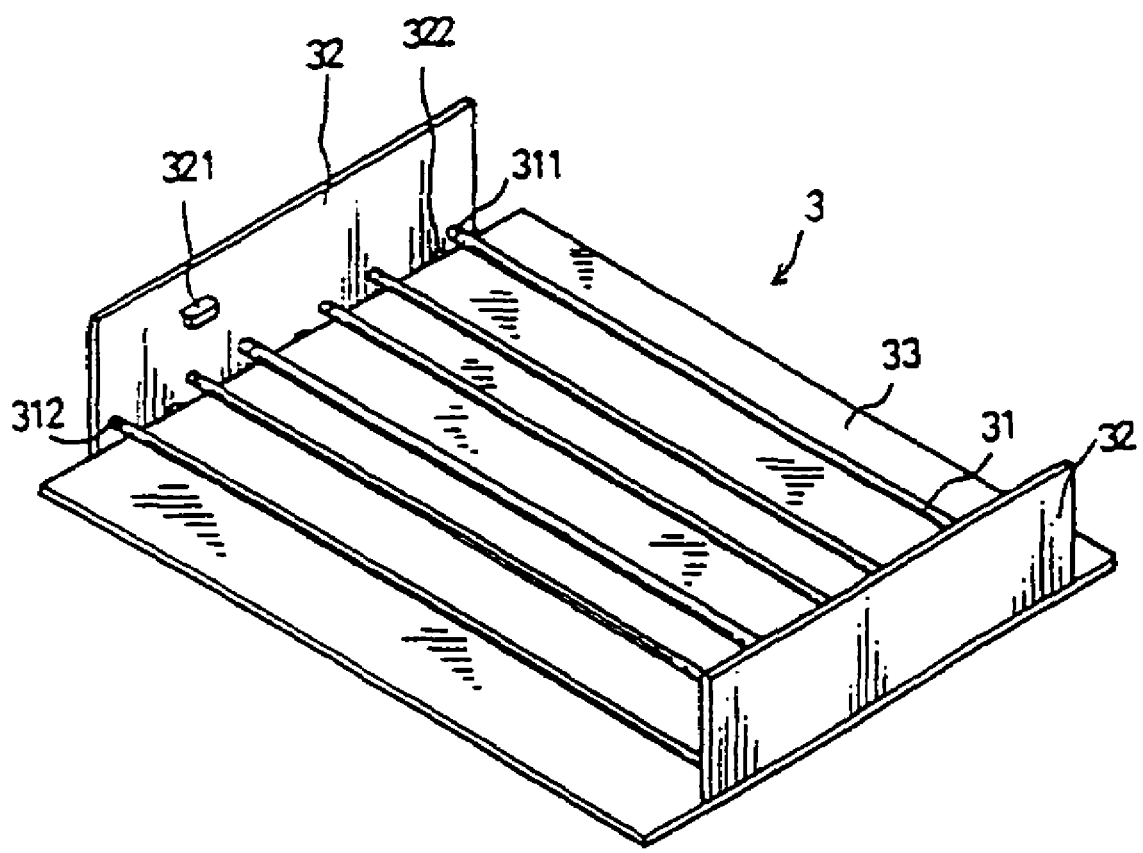
Figure 3:
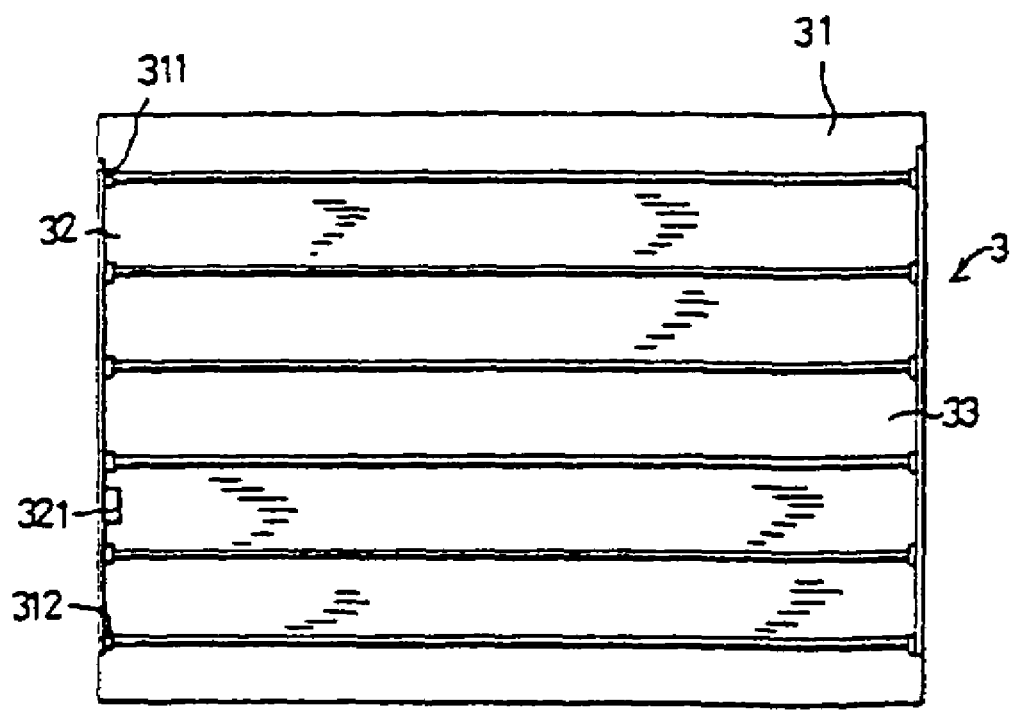

FIGS. 3a and 3b illustrate a backlight module 3 which is similar to the backlight module 2 in the first embodiment. The backlight module 3 comprises a plurality of linear lamps 31 above a reflecting plate 33, each lamp 31 comprising two ends, and each end electrically and physically connected to a first circuit board 32 through an electrode 311 and a second circuit board 34 located at opposite sides of the reflecting plate 33; wherein the circuit boards 32 and 34 stand vertically to the reflecting plate 33, directly connecting the electrodes 311 thereby. In the embodiment, the first circuit board 32 comprises a power-supplying end 321 enabling to provide the lamps 31 voltage and electrically connecting the second circuit board 34 through wires (not shown) to separately deliver voltage to every lamp.

The connections of the circuit board and the electrode, the designs of the circuit and power-supplying end can be made by those skilled in the art, based on their specific knowledge of electronics. Besides, other elements for additional effects, for example, fixing elements or protecting tubes, can be also added into the backlight module in the invention optionally.

The present invention is suitable for all kinds of direct under type backlight module, wherein numbers and shapes of the lamp and designs of circuit in the circuit board are not limited in the disclosures of the embodiments mentioned above. Backlight modules of liquid crystal display device having a plurality of lamps electrically connected to at least one circuit board directly to make a plurality of electrodes of the lamp disposed adjacently to the circuit board are in the scope of the invention.

As embodiments of the present invention have been illustrated and described, various modifications and improvements can be made by persons skilled in the art. The embodiments of the present invention are therefore described in an illustrative but not restrictive sense. It is intended that the present invention is not limited to the particular forms as illustrated, and that all the modifications not departing from the spirit and scope of the present invention are within the scope as defined in the appended claims.

What is claimed is:

1. A backlight module for use in a liquid crystal display device comprising:
    a reflecting plate;
    a plurality of lamps disposed above the reflecting plate, each of the lamps comprising two ends each including an electrode; and
    at least one circuit board located on at least one of two sides of the reflecting plate to simultaneously provide voltage required for the lamps, wherein the electrodes directly electrically connect the at least one circuit board and the circuit board is oriented substantially perpendicularly to the reflecting plate.

2. A backlight module according to claim 1 which comprises a circuit board, wherein the lamps are U-shaped lamps which form the two electrodes to directly connect to the circuit board.

3. A backlight module according to claim 1 which comprises two circuit boards disposed at two opposite sides of the reflecting plate, respectively, wherein the lamps are linear lamps each of which forms the two electrodes to directly connect to the two circuit boards.

4. A backlight module according to claim 1 further comprising a plurality of protecting tubes to wrap the electrodes wherein the protecting tubes are made of dielectric material.

5. A backlight module according to claim 1, wherein the at least one circuit board comprises at least one power-supplying end disposed thereon.

6. A backlight module according to claim 1 further comprising a back cover, and the at least one circuit board further comprises a plurality of fixing elements to fix the at least one circuit board to the back cover.

7. A backlight module according to claim 1, wherein the electrodes are welded to the at least one circuit board directly.

8. A backlight module for use in a liquid crystal display device comprising:
    a reflecting plate;
    a plurality of lamps disposed above the reflecting plate, each of the lamps comprising two ends each including an electrode; and
    at least one circuit board located on at least one of two sides of the reflecting plate to simultaneously provide voltage required for the lamps, wherein the electrodes are directly electrically connected to and physically engage the at least one circuit board.

9. A backlight module according to claim 8, wherein the circuit board is disposed substantially perpendicular to the reflecting plate.

10. A backlight module for use in a liquid crystal display device comprising:
    a reflecting plate;
    a plurality of lamps disposed above the reflecting plate, each of the lamps comprising two ends and one longitudinal axis, each of the ends comprising an electrode; and
    at least one circuit board located on at least one of two sides of the reflecting plate to provide voltage required for the lamps, wherein the electrodes directly electrically connect to at least one side face of the circuit board and the side face is oriented substantially perpendicularly to at least one longitudinal axis of the lamps.

* * * * *